12/9/86 OR 4,628,177

United States Patent [19]

Dempsey et al.

[11] Patent Number: 4,628,177

[45] Date of Patent: Dec. 9, 1986

[54] ARC WELDING TORCH

[75] Inventors: Will R. Dempsey, Owens Cross Roads, Ala.; Ernest O. Bayless, Petersburg, Tenn.; Samuel D. Clark, Huntsville, Ala.

[73] Assignee: B & B Precision Machines, Inc., Owens Cross Roads, Ala.

[21] Appl. No.: 639,444

[22] Filed: Aug. 10, 1984

[51] Int. Cl.[4] .......... B23K 9/00

[52] U.S. Cl. .......... 219/121 PN; 219/121 PJ; 219/121 PP; 219/121 PR; 219/75

[58] Field of Search .......... 219/74, 75, 76.16, 121 PR, 219/121 PP, 121 PQ, 121 PM, 121 PA, 121 PN; 313/231.31, 231.51; 315/111.21

[56] References Cited

U.S. PATENT DOCUMENTS 3,304,402 2/1967 Thorpe .......... 219/121 PQ
3,557,337 1/1971 Sipos et al. .......... 219/75
3,858,072 12/1974 Dembovsky .......... 219/121 PQ
4,146,654 3/1979 Guyonnet .......... 219/121 PQ
4,367,393 1/1983 Yerushalmy et al. .......... 219/121 PM
4,389,559 6/1983 Rotolico et al. .......... 219/121 PQ

*Primary Examiner*—M. H. Paschall
*Attorney, Agent, or Firm*—C. A. Phillips; Michael L. Hoelter

[57] ABSTRACT

A plasma arc welding torch which provides a leak-free method of conveying a plasma arc through a replaceable orifice onto a workpiece. An electrode holding assembly concentrically aligns an electrode with respect to this orifice and an electrode setting tool secures this electrode a specific known distance from a surface of this orifice. Plasma gas and orifice gas travel through passageways in the torch and are discharged out of the torch surrounding the electrically generated arc. A cooling fluid is circulated within a cooling chamber located adjacent to this orifice to reduce the temperature of this torch.

6 Claims, 10 Drawing Figures

ARC WELDING TORCH

This invention was made with Government support under Contract NAS8-34834 with the National Aeronautics and Space Administration. The Government has certain rights in this invention.

FIELD OF THE INVENTION

This invention relates generally to plasma arc welding, and particularly to a plasma arc welding torch that provides an improved method of sealing for leak-free operation under high temperature operating conditions.

DESCRIPTION OF PRIOR ART

In general, plasma arc welding torches enclose an internal electrode which is positioned a specific and calibrated distance from a plasma orifice such that when the electrode and the plasma orifice are each connected to separate leads of a D.C. power supply, an arc is generated between them within the torch. This arc is then transferred out of the torch through an orifice by a low pressure plasma gas to thus create a plasma arc that is directed toward the workpiece to be welded. This plasma gas, before exiting the torch, flows around the electrode to help shield the body of the torch from the extreme heat of this electrode. However, additional cooling of the torch is necessary, and especially of the plasma orifice through which the plasma arc passes, and thus there is a cooling chamber in the torch that surrounds this plasma orifice. A cooling fluid is circulated through this cooling chamber to absorb excess heat and to reduce the temperature of this region of the torch during its operation.

An additional pressurized gas, called a shield gas, is circulated within the torch, and this shield gas is discharged so as to surround the plasma arc and thus "shield" this arc while it strikes the workpiece. This shield gas isolates the molten metal of the weld from the atmosphere, preventing oxidation on the workpiece while at elevated temperatures.

Each of these fluids, cooling fluid, plasma gas and orifice gas, is circulated through the torch via separate and distinct channels within the torch. There are thus four channels within this torch: cooling supply and return channels, an orifice gas channel, and a shield gas channel. Since plasma arc welding torches are capable of generating temperatures of up to 60,000° F., with some torches capable of exceeding the thermalnuclear limit of 200,000° F., the individual manufactured components of these torches are subject to significant thermal expansion and contraction. This expansion and contraction must be controlled if leakage is to be prevented from those channels that carry these pressurized fluids within the torch. Any leakage from these channels will reduce the efficiency of this welding torch and will also create a safety hazard for personnel who operate this torch since they will then become exposed to these pressurized fluids.

Currently, plasma arc welding torches are assembled using O-rings or other types of resilient gasket material to seal between the various expanding components of this torch. After repeated cycles of expansion and contraction, this gasket material becomes less resilient due to fatigue or to its exposure to such high temperatures, or both. When this occurs, the sealing ability of this material decreases; and when such a reduction occurs to the gasket material, sealing the four pressurized channels within the torch, the torch begins to leak fluids. Also, foreign particles, such as those normally found in a fluid, and especially pressurized fluid, have been known to become lodged against and build up upon this gasket material, which also prevents this material from sealing properly, thus further enbaling the pressurized fluid to leak.

Another operational problem that plagues the currently available torches is their inablility to quickly and accurately align the electrode within the torch with respect to the plasma orifice. For proper operation, the electrode must be positioned a specific distance (having a tolerance of only a few thousandths of an inch) from a surface of the plasma orifice to insure a proper arc. As either the electrode or the plasma orifice is consumed, the electrode must be realigned and repositioned for proper torch operation. The presently available torches require a partial disassembly to effect such an alignment, and this disassembly is labor-intensive in addition to increasing the likelihood of entrapping foreign substances within the torch which can thus cause it to leak. Furthermore, this disassembly generally occurs in a well-equipped workshop which is usually some distance from the workpiece that is being welded. Thus, there may occur a situation where after only five minutes of operation, a plasma arc welding torch has to be removed and disassembled, which may take upwards of one hour to complete.

Therefore, it is a purpose of the invention to provide a sealless plasma arc welding torch that does not leak when subject to the different expansion and contraction rates of the operating torch.

It is a further feature of this invention to provide an easily replaceable and adjustable electrode that is positioned within the torch so that as the electrode requires realignment, such may be accomplished quickly and easily in the field without requiring a well-equipped workshop.

Additionally, it is a purpose of this invention to provide a plasma orifice that is cooled so as to extend its useful life and also one that is replaceable when, after becoming sufficiently consumed, is no longer operational.

SUMMARY OF THE INVENTION

In accordance with the present invention, a plasma arc welding torch includes a hollow outer housing and an insertable electrode holding assembly. This outer housing contains a series of tubular channels positioned around its hollow interior. The outer housing supports a removable nosepiece in one end in addition to a shield gas cover that partially protects this nosepiece. The electrode holding assembly, when positioned within the housing interior, concentrically supports an electrode, and this electrode is secured a known and calibrated distance from one surface of the nosepiece in addition to being electrically isolated from the nosepiece. Two welding gases travel through separate channels in the housing before they are ejected from the torch either through an orifice in the nosepiece or adjacent to this orifice. A cooling chamber within the housing connects to a separate pair of channels, one being a supply channel and the other a return channel, and this chamber surrounds the nosepiece and cools it.

DETAILED DESCRIPTION OF THE INVENTION

Figure 1:
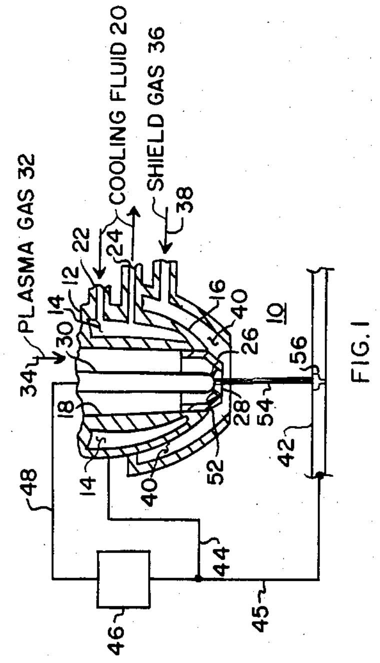
FIG. 1 is a diagrammatic illustration of the operation of the plasma arc welding torch.

Referring initially to FIG. 1, there is shown a diagrammatic illustration of the operation of plasma arc welding torch 10. Torch 10 comprises an outer hollow housing 12 and an annular cooling chamber 14 in its nose end region 16. This cooling chamber 14 surrounds a portion of a central cavity 18 in torch 10, and cooling fluid 20, such as water or ethylene glycol, circulates through cooling chamber 14 via cooling fluid inlet 22 and cooling fluid outlet 24. This cooling chamber 14 also partially surrounds a nosepiece 26 that is removably secured to housing 12, and this nosepiece 26 has a central orifice 28 therethrough that is concentrically positioned with respect to cavity 18. An electrode 30 is centrally positioned within cavity 18 and is in alignment with orifice 28. When torch 10 is operating, electrode 30 becomes very hot, and cooling chamber 14, due to the circulation of cooling fluid so therethrough, cools nosepiece 26 and nose end region 16 of torch 10.

Pressurized plasma gas 32, such as argon, is channeled within housing 12 and travels through cavity 18 in the direction of arrow 34. This plasma gas 32 passes around electrode 30 before being discharged from torch 10 via orifice 28 in nosepiece 26. A pressurized shield gas 36, such as helium, is also channeled within housing 12, and it flows in the direction of arrow 38 into a separate cavity, cavity 40. This shield gas 36 is discharged from torch 10 surrounding or shielding the emerging plasma gas 32. The relative pressures of plasma gas 32 and shield gas 36 is such that plasma gas 32 is under a lower pressure than that of shield gas 36. This is because the pressure of plasma gas 32 must be maintained so that when this gas strikes a workpiece 42, no turbulence is created around the area of the weld. Shield gas 36 is of a higher pressure so as to shield plasma gas 32 and the area of workpiece 42 around the weld.

Housing 12 and workpiece 42 are generally connected to leads 44 and 45, respectively, of a D.C. power source 46 while electrode 30 is coupled to lead 48 of this power source 46. Power source 46 provides a variable polarity to leads 44, 45, and 48, with the polarity of leads 44 and 45 being opposite to an alternating with that of lead 48 such that when leads 44 and 45 are positively charged, lead 48 is negatively charged, and vice versa. When leads 44 and 45 are positively charged, this condition occurs for approximately 4 milliseconds; whereas, when leads 44 and 45 are negatively charged, this condition occurs for approximately 19 milliseconds.

Insulative sleeve 50 (FIG. 3) electrically insulates housing 12 from electrode 30. Thus, when power source 46 is activated and electrode 30 is positioned sufficiently close to a surface of nosepiece 26, nosepiece 26 being electrically connected to housing 12, an arc 52 is generated between electrode 30 and nosepiece 26. This arc 52 is transferred out torch 10 through orifice 28 by pressurized plasma gas 32 to thus create a plasma arc 54. This plasma arc 54 is surrounded by the emerging shield gas 36, and this arc 54 strikes workpiece 42 to thus generate a distinctive wineglass-shaped weld bead 56. As indicated, plasma gas 32, and thus plasma arc 54, are under low pressure to prevent it from causing a displacemnt of the molten metal in weld bead 56. Pressurized shield gas 36 surrounding plasma arc 54 also helps prevent this displacement of the molten metal by reducing turbulence in this area.

Plasma arc welding torch 10 has a capacity of generating temperatures of approximately 60,000° F. The greater the power used, the greater the temperature that can be generated. This is because plasma arc 54 is essentially an ionized conducting gas which conducts heat from electrode 30 to workpiece 42. The plasma gas 32 which transfers this arc out of torch 10 also helps shield this torch 10 from the extreme heat of electrode 30. Additional cooling of nose end region 16 of torch 10 is necessary, though, and this is the function of cooling chamber 14 and its circulating cooling fluid 20.

Figure 2:
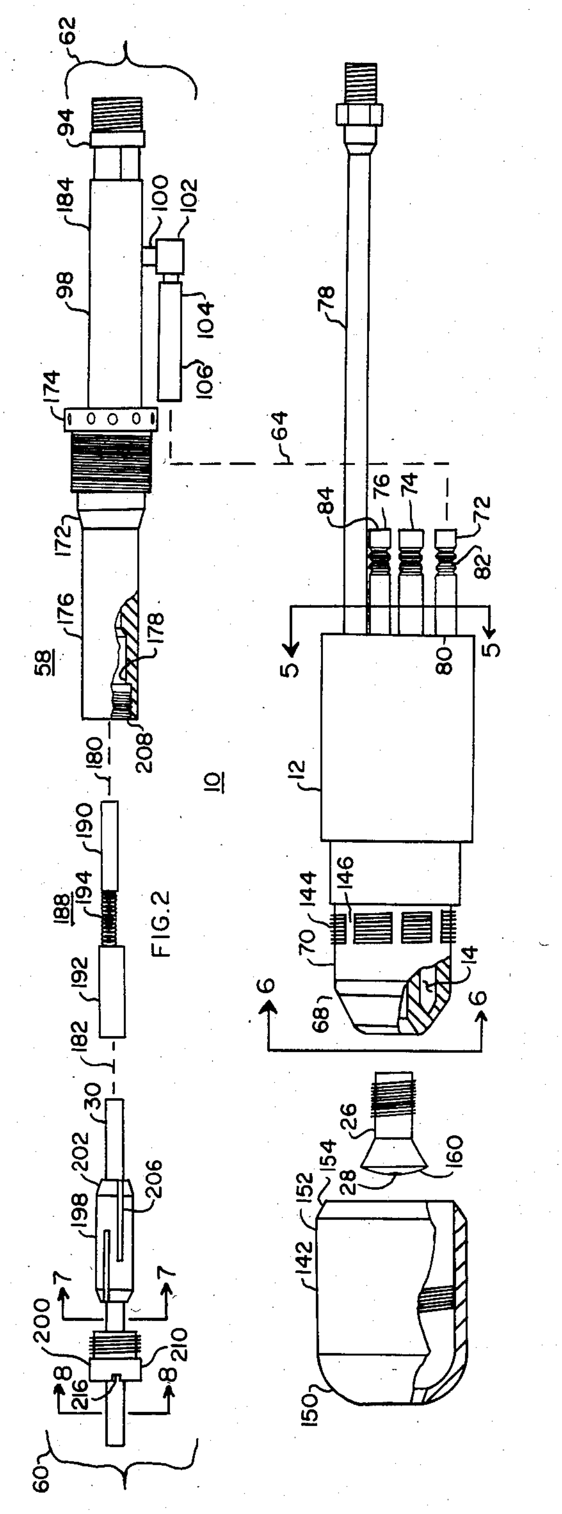
FIG. 2 is an exploded view illustrating the various components of the plasma arc welding torch.
Figure 3:
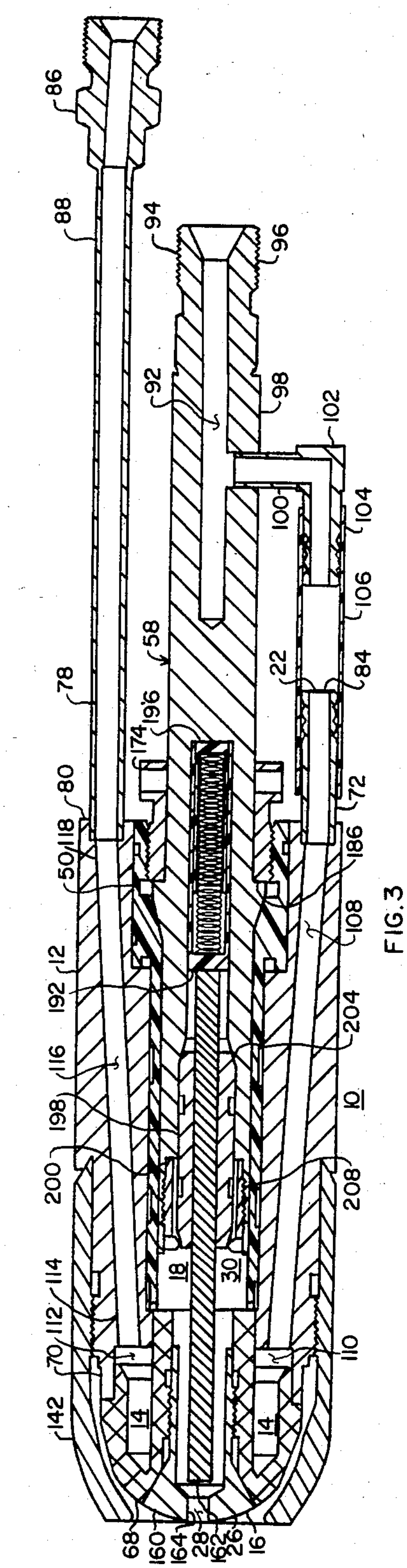
FIG. 3 is a sectional view of the assembled torch taken along line 3—3 of FIG. 5.
Figure 6:
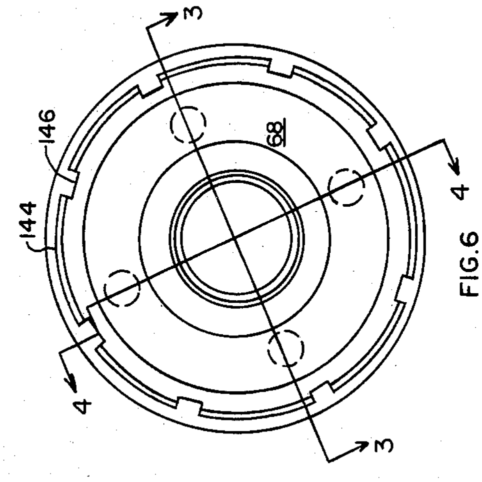
FIG. 6 is a front view taken along line 6—6 of FIG. 2.
Figure 5:
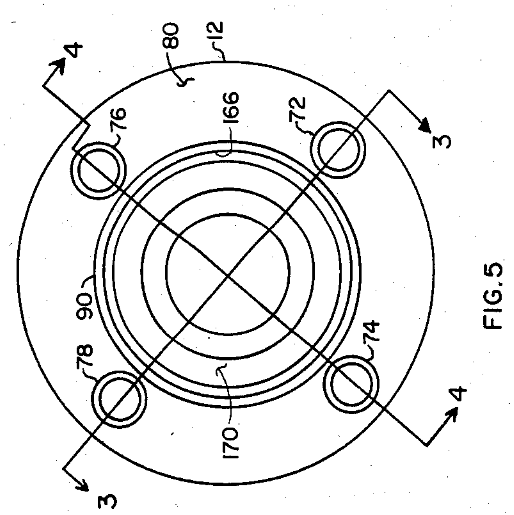
FIG. 5 is an end sectional view taken along line 5—5 of FIG. 2.
Figure 4:
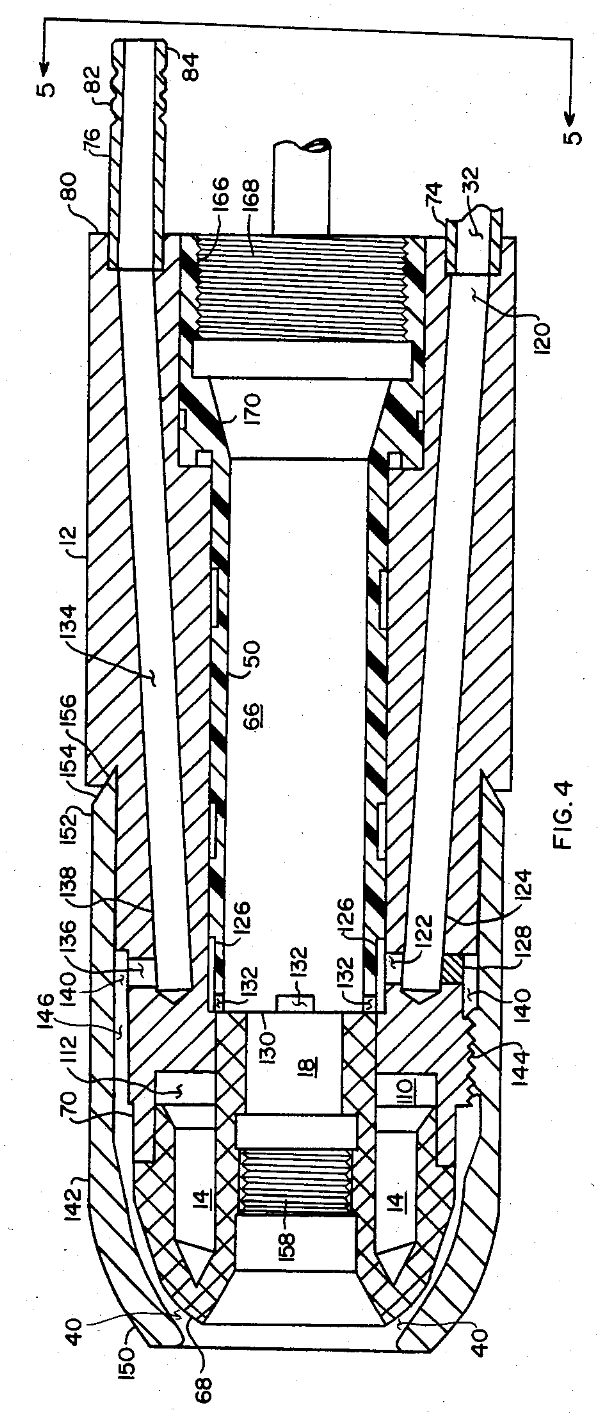
FIG. 4 is a sectional view of this torch minus the electrode holding assembly taken along line 4—4 of FIG. 5.

Referring now to FIGS. 2 and 3, there is shown an exploded and an assembled view, respectively, of plasma arc welding torch 10. Torch 10 consists of outer hollow torch housing 12 that surrounds electrode holding assembly 58. This assembly 58 is shown in FIG. 2 as being surrounded by brackets 60 and 62. As indicated by dotted line 64, electrode holding assembly 58 is to be partially inserted within hollow torch housing 12. FIGS. 4–6 illustrate torch 10 minus electrode holding assembly 58 for clarity.

Referring now also to FIGS. 4 and 5, housing 12 is metallic in composition and generally cylindrical in construction having a hollow core 66 therethrough of varying diameter so as to accommodate electrode holding assembly 58. Housing 12 is generally constructed of copper or one-half hard brass, and a cooling jacket 68, generally made of copper, is fused within and to end 70 of housing 12. The expansion property of cooling jacket 68 is such that, as the temperature increases, it expands at a greater rate than housing 12. Thus, as temperatures increase, the engaging surfaces of cooling jacket 68 and housing 12 remain sealably connected.

Three smaller tubes 72, 74, and 76 and one rather elongated tube 78 project out from end 80 of housing 12. Each of these tubes are braced into a mating opening in end 80 of housing 12 to provide a passageway between these tubes and housing 12 (FIGS. 3 and 4). A hose barb fitting 82 is configured on end 84 of each of smaller tubes 72, 74, and 76 in order to couple with a hose (not shown), and a threaded fitting 86 is secured to end 88 of elongated tube 78 that mechanically couples with a compatible fitting (not shown). These four tubes 72, 74, 76, and 78 are all symmetrically arranged around opening 90 of hollow core 66 (FIG. 5), and each of these tubes provides passage for a fluid either into or out of housing 12. Small tube 72 and elongated tube 78 enable cooling fluid entrance and exit, respectively, while plasma gas enters housing 12 through tube 74 and shield gas enters housing 12 through tube 76.

Pressurized cooling fluid 20 enters housing 12 via passageway 92 through mechanical coupler 94 in end region 96 of electron holder 98 of electrode holding assembly 58 (FIG. 3). Passageway 92 partially extends within electrode holder 98 before it is terminated. A stub tube 100 intersects passageway 92 and connects to an elbow hose barb 102 that is coupled to end 104 of a short length of flexible, non-conducting hose 106 (FIG. 2). Hose 106 connects to hose barb fitting 82 of smaller tube 72, as indicated by dashed line 64, which is cooling fluid inlet 22. Cooling fluid 20 is then pumped along channel 108 (FIG. 3) within housing 12. Channel 108 discharges this fluid 20 into entrance passageway 110, formed between housing 12 and cooling jacket 68, which leads to annular cooling chamber 14. This fluid 20 then circulates within cooling chamber 14 within cooling jacket 68 and cools nose end region 16 of torch 10 before exiting cooling chamber 14 via exit passageway 112. Exit passageway 112 is identical to entrance passageway 110, and exit pasageway 112 connects to end 114 of channel 116 within housing 12. Opposite end 118 channel 116 connects to elongated tube 78 and through this tube 78 cooling fluid 20 exits torch 10.

Referring now generally to FIG. 4, plasma gas 32 enters housing 12 through tube 74 and travels along channel 120. Passageway 122 connects to end 124 of channel 120 and discharges plasma gas 32 into an outer annular notch 126 in insulation sleeve 50. Plug 128, positioned opposite of passageway 122, prevents plasma gas 32 from traveling in this direction. Outer annular notch 126 extends around the outer perimeter of end 130 of insulative sleeve 50, and a series of openings 132 in this region of sleeve 50 provide a connecting pathway between notch 126 and central cavity 18 in housing 12. Plasma gas 32 travels through passageway 122, notch 126, and openings 132 before entering central cavity 18. The plasma gas 32 then circulates around electrode 30 (FIG. 3) that extends within central cavity 18 before this gas passes out orifice 28 in nosepiece 26 to thus emerge from torch 10 in a jet stream.

Shield gas 36 enters housing 12 through tube 76 and travels along channel 134 (FIG. 4) in housing 12. Passageway 136 connects to end 138 of channel 134 and directs shield gas 36 radially outward through passageway 136. Passageway 136 directs this fluid into annular chamber 140 that is formed between housing 12, shield gas cover 142, and exterior screw threads 144 on housing 12. A series of spaced longitudinal slots 146 (FIGS. 2, 4, and 6) in threads 144 provide passage through threads 144 and into cavity 40 between shield gas cover 142 and cooling jacket 68. Shield gas 36 flows through passageway 136, chamber 140, slots 146, and into cavity 40 where it is discharged from torch 10 surrounding or shelding the emerging plasma gas 32 from orifice 28.

Shield gas cover 142 (FIGS. 2, 3 and 4), generally constructed of aluminum, threads onto exterior screw threads 144 on housing 12 and protects nose end region 16 of torch 10 during the welding operation. End region 150 of cover 142 is curved so as to conform to the curvature of cooling jacket 68. The opposite end, end 152, of shield gas cover 142 has a tapered surface 154 which sealably extends into annular "V" groove 156 in housing 12 to prevent the escape of shield gas 36. Shield gas cover 142 is removable and must be removed when access is desired within housing 12.

Hollow nosepiece 26 (FIGS. 2 and 3), generally constructed of copper, fits within nose end region 16 of torch 10 and threads onto interior screw threads 158 (FIG. 4) located interior of cooling chamber 14 on cooling jacket 68. Exposed end 160 of nosepiece 26 is curved to match that of cooling jacket 68, and a centrally positioned orifice 28 extends through nosepiece 26, allowing plasma gas 32 to pass out of torch 10. The hollowed interior of nosepiece 26 is sized to permit electrode 30 to partially extend within it (FIG. 3), and this electrode 30 is concentrically aligned with respect to orifice 28. Electrode 30 is postioned so that end 162 is placed a specific distance from the interior perimeter 164 of orifice 28 so that an arc is generated between them. As nosepiece 26 becomes worn away due to the electrical arc 52 generated between electrode 30 and the interior perimeter 164 of orifice 28, nosepiece 26 is removed from torch 10 and replaced.

Insulative sleeve 50 (FIGS. 3 and 4), constructed of fiberglass, maintains the electrical separation between electrode 30 and nosepiece 26. This sleeve 50 is secured, such as by epoxy, to the interior of housing 12, and it lines a portion of hollow core 66. As previously indicated, sleeve 50 electrically isolates housing 12 from electrode holding assembly 58, and the interior of end region 166 of insulative sleeve 50 is threaded so as to support electrode holding assembly 58 within housing 12. Adjacent to these threads, threads 168, is an inwardly tapering surface 170 that engages a mating tapering surface 172 on electrode holding assembly 58 to thus insure proper alignment of electrode holding assembly 58 within housing 12 when inserted. Spanner nut 174 (FIGS. 2 and 3) slides on electrode holding assembly 58 and secures this assembly in place by threadably engaging threads 168 on insulative sleeve 50.

Electrode holder 98 (FIGS. 2 and 3) surrounds electrode holding assembly 58 and is generally cylindrical in configuration. Holder 98 has a front end region 176 that is inserted into hollow core 66 of housing 12 and engages the inner surface of insulative sleeve 50. This front end region 176 is also hollow having an inner surface 178 of varying diameter so as to accommodate the additional elements of electrode holding assembly 58 as identified by dashed lines 180 and 182. Opposite or back end region 184 of electrode holder 98 contains a threaded coupler 94 through which cooling fluid 20 enters as previously described. Coupler 94 couples with a coolant supply hose (not shown) in a similar manner as fitting 86 on elongated tube 78 couples with a coolant return hose (not shown). Stub tube 100 and elbow hose barb 102 connect to an intermediate region of electrode holder 98, and non-conducting hose 106 provides passage for cooling fluid 20 from elbow hose barb 102 to tube 72. This non-conducting hose 106 maintains the electrical separation between electrode holding assembly 58 and housing 12. Spanner nut 174, slidable along electrode holder 98, butts against ridge 186, (FIG. 3) and threadably secures electrode holder 98 against insulative sleeve 50 within housing 12.

Figure 7:
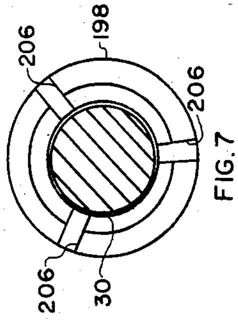
FIG. 7 is an end view of the collet taken along line 7—7 of FIG. 2.
Figure 8:
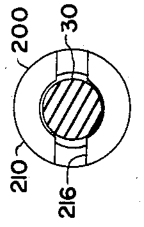
FIG. 8 is an end view of the collet nut taken along line 8—8 of FIG. 2.

Telescoping case 188 (FIGS. 2 and 3) is positioned within hollow front end region 176 of electrode holder 98, and this telescoping case 188 includes an inner case 190, an outer case 192, and a spring 194. Inner case 190 is butted against an inner surface 196 of hollow electrode holder 98, and outer case 192, which slides around inner case 190, encloses spring 194 between them. Electrode 30 is engaged by outer case 192, and enclosed spring 194 biases electrode 30 outward toward nosepiece 26 and orifice 28. Electrode 30 is a metallic elongated rod of generally small diameter that is held in place inside electrode holder 98 by collet 198 and collet nut 200. Collet 198 slides around electrode 30 (FIG. 7) and has a tapered end region 202 that engage a similarly tapered region 204 within hollow electrode holder 98. These tapered regions 202 and 204 insure the concentric alignment of electrode 30 within electrode holder 98, and this in turns insures the concentric alignment of electrode 30 with respect to orifice 28 in nosepiece 26. Collet 198 has spaced longitudinal slots 206 therein that are compressed by collet nut 200 to clamp electrode 30 in place. Collet nut 200 slides around electrode 30 (FIG. 8) and is threaded to mate with interior threads 208 in front end region 176 of electrode holder 98. Collet nut 200 has a slotted head 210 to assist in the threading of collet nut 200 onto threads 208 and also in the clamping of collet 198 against electrode 30 to thus retain electrode 30 in position.

Figure 9:
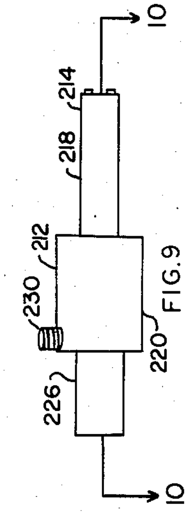
FIG. 9 is a pictorial view of the electrode setting tool.
Figure 10:
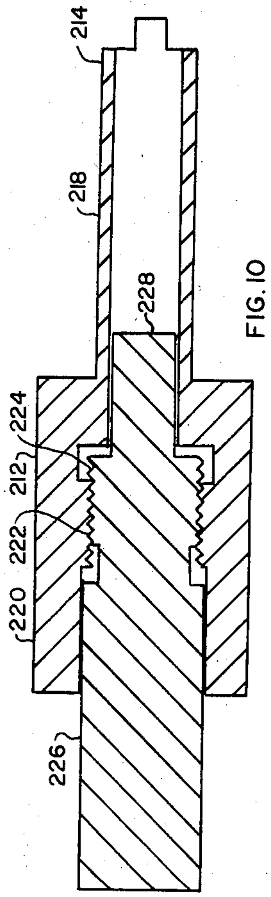
FIG. 10 is a sectional view of the electrode setting tool taken along line 10—10 of FIG. 9.

Electrode setting tool 212 (FIGS. 9 and 10) is keyed at one end, end 214, to fit within slot 216 in collet nut 200. End region 218 of tool 212 is configured as a hollow cylinder to enable it to slide around electrode 30 in order that keyed end 214 can engage slot 216 in collet nut 200 when collet nut 200 is securing electrode 30 within electrode holding assembly 58. Opposite of end region 218 is enlarged hollow cylindrical housing 220 which contains interior threads 222. These threads 222 mate with corresponding threads 224 on stem 226 which is inserted within hollow housing 220. Stem 226 is configured having a projecting electrode compressor 228 that extends partially within end region 218 of tool 212. Stamp 226 is also indexed such that a given rotation of stem 226 with respect to housing 220 causes electrode compressor 228 to move a specific distance within end region 218. Once stem 226 and thus electrode compressor 228 are moved to their desired positions, a lock bolt 230, threaded into housing 220, is rotated to engage and lock stem 226 in place. Keyed end 214 of tool 212 engages slot 216 in collet nut 200 to loosen or tighten nut 200 as desired. When collet nut 200 is loosened, collet 198 expands, thereby no longer clamping electrode 30, causing spring 194, enclosed within telescopic case 188, to push electrode 30 through the loosened collet 198 and collet nut 200. Electrode 30 is then biased toward nosepiece 26 and the interior perimeter 164 of orifice 28. This bias of spring 194 is overcome by electrode compressor 228 in tool 212 which engages end 162 of electrode 30 and thus resists its movement toward nosepiece 26. When electrode 30 is thus loosened and in contact with electrode compressor 228, tool 212 is rotated to thus rotate collet nut 200 to again cause collet 198 to clamp electrode 30 in place.

The exact positioning of electrode 30 within electrode holding assembly 58 is dependent upon the position of electrode compressor 228 within end region 218 of tool 212, and stem 226 can be rotated to change the position of electrode compressor 228. When properly installed, end 162 of electrode 30 is approximately 0.045 inch from interior perimiter 164 of orifice 28, thus permitting the proper arc to occur between them.

To operate, plasma welding torch 10 requires an electrode to be concentrically aligned with respect to orifice 28 and accurately gapped with respect to the interior perimeter 164 of orifice 28. To position electrode 30, first, shield gas cover 142 and nosepiece 26 must be removed; then, hollow end region 218 of electrode setting tool 212 is inserted within plasma torch 10 and around electrode 30 until keyed end 214 engages slot 216 in collet nut 200. Collet nut is rotated until collet 198 is no longer compressed against electrode 30, and the bias of spring 194 pushes electrode 30 against electrode compressor 228 of tool 212. At this time, if a new electrode is to be inserted, then tool 212 is removed and the old electrode is exchanged for the new one and tool 212 is then reinserted around this new electrode. On the other hand, if electrode 30 is merely to be regapped, then tool 212 is not removed. Either way, however, once electrode 30 engages electrode compressor 228, stem 226 of tool 212 is rotated to move electrode 30 to its desired position before stem 226 is locked in place by lock bolt 230 if this had not been accomplished earlier. Electrode 30, being depressed by electrode compressor 228, thereby compresses spring 194 and telescoping case 188. With keyed end 214 of tool 212 in slot 216 of collet nut 200, collet nut 200 is tightened, which causes collet 198 to clamp against electrode 30. Electrode 30 is now positioned so that it is spaced the required distance from the inner perimeter 164 of orifice 28 as well as being concentrically aligned with respect to orifice 28 within electrode holder 98. To remove or readjust this electrode, the same procedure is used. Once electrode 30 is aligned and gapped and tool 212 removed, nosepiece 26 and shield gas cover 192 are reinstalled. Supply and return hoses (not shown) for cooling fluid 20, plasma gas 32, and shield gas 36 are then connected, if not already connected, to their respective couplers.

Referring now once again to FIG. 1, there is illustrated the operation of plasma torch 10. As shown, cathode lead 48 from D.C. power supply 46 is connected to electrode 30 or to the electrode holding assembly 58, and anode lead 44 of power supply 46 is connected to housing 12. When D.C. power suppy 46 is activated, an arc 52 is created between the negatively charged electrode and the positively charged nosepeice 26. Arc 52 is carried out of torch 10 by plasma gas 32, thus forming the plasma arc 54. Cooling fluid 20 is circulated through cooling chamber 14 to reduce the temperature of torch 10 caused by arc 52. Shield gas 36 is pumped through tube 76 and is discharged between nose end region 16 and shield gas cover 142 around the discharged plasma arc 54. As plasma arc 54 strikes workpiece 42, a small hole is burned in the material that is to be welded, and as plasma torch 10 proceeds along workpiece 42, the hole also progresses. This hole, however, is filled up by the molten metal as the torch passes, thus providing 100% penetration.

What is claimed is:

1. A plasma arc welding torch assembly comprising:

an elongated, generally cylindrical, housing having an opening at one end;

a first annular chamber having an inlet coupled to receive a shield gas and an outlet, said outlet being concentric with said opening, and providing to said opening said shield gas;

a removable nosepiece sealably countersunk within said opening against said housing inboard of said first annular chamber, said nosepiece having a passageway therethrough and an orifice concentric with said opening;

a heat exchanger positioned adjacent to and heat conductively coupled to said nosepiece, said heat exchanger including a coolant chamber adjacent to and outboard of said nosepiece, and said coolant chamber being fluid coupled to a fluid inlet and outlet, whereby a cooling fluid may be circulated through said coolant chamber, cooling said heat exchanger and said nosepiece; and electrode holding means for holding an electrode within said passageway adjacent said orifice, said electrode holding means comprising:

insulating means for electrically insulating said electrode from said housing and said nosepiece, spring biasing means for biasing said electrode toward said orifice;

gripping means for selectively gripping said electrode and overcoming said bias to retain said electrode in a selected position with respect to said orifice, electrical means for electrically biasing said electrode with respect to said nosepiece, and electrode adjustment means, including a tubular member adapted to extend through said opening and around said electrode, for operating said gripping means and biasing said spring bias means to vary the longitudinal position of said electrode with respect to said orifice.

2. A plasma arc welding torch assembly as set forth in claim 1 wherein said coolant chamber is an annular chamber.

3. A plasma arc welding torch assembly as set forth in claim 1 wherein:

said gripping means includes a collet positionable around an electrode and a collet sleeve adapted to fit over and adjustably compress said collet; and said tubular member of said electrode adjustment means includes means for movement of said collet sleeve between a compressed and relaxed position with respect to said collet.

4. A plasma arc welding torch assembly as set forth in claim 3 wherein said collet sleeve is threadably supported by said electrical holding means, and said tubular member of said electrode adjustment means includes means for rotating said collet sleeve.

5. A plasma arc welding torch assembly as set forth in claim 4 wherein said electrode adjustment means includes an extensible member positionable within said tubular member and threadably engaged with said tubular member, whereby, with said collet sleeve rotated to a relaxed position by said tubular member, said extensible member is rotated and moved longitudinally and in engagement with an electrode to selectively position said electrode, and finally, by rotation of said tubular member, said collet sleeve is tightened and said electrode gripped in a selected longitudinal position.

6. A plasma arc welding torch assembly as set forth in claim 5 wherein said electrode adjustment means includes spring bias means for biasing an electrode against said extensible member, whereby rotation of said extensible member enables longitudinal movement of said electrode in either direction.

* * * * *